United States Patent [19]

Guile

[11] Patent Number: 4,659,680
[45] Date of Patent: Apr. 21, 1987

[54] STABILIZED ZIRCONIA BODIES OF IMPROVED TOUGHNESS

[75] Inventor: Donald L. Guile, Horseheads, N.Y.

[73] Assignee: Corning Glass Works, Corning, N.Y.

[21] Appl. No.: 642,091

[22] Filed: Aug. 20, 1984

[51] Int. Cl.[4] .............................................. C04B 35/48
[52] U.S. Cl. .................... 501/104; 501/103; 501/152; 428/404; 264/66
[58] Field of Search ...................... 501/103, 104, 152; 428/404; 264/66

[56] References Cited

U.S. PATENT DOCUMENTS

| | | | |
|---|---|---|---|
| 3,541,193 | 11/1970 | Adams | 264/66 |
| 4,067,745 | 1/1978 | Garvie et al. | 501/104 |
| 4,279,655 | 7/1981 | Garvie et al. | 501/20 |
| 4,344,904 | 8/1982 | Yamada et al. | 501/104 |
| 4,370,393 | 1/1983 | Watanabe et al. | 501/103 |

FOREIGN PATENT DOCUMENTS

WO83/04247 12/1983 World Int. Prop. O. .......... 501/104

*Primary Examiner*—William R. Dixon, Jr.
*Assistant Examiner*—Steven Capella
*Attorney, Agent, or Firm*—C. S. Janes, Jr.

[57] ABSTRACT

This invention is directed to the preparation of $ZrO_2$ bodies partially stabilized through the inclusion of 0.5–10% $Y_2O_3$ with 1–10% of a secondary stabilizer selected from the group of MgO, CaO, CuO, ZnO, and $CeO_2$. The method comprises sintering a shaped batch at 1600°–1800° C., quickly cooling the sintered shape to 1000°–1475° C., holding said shape within that temperature range to cause precipitation of tetragonal $ZrO_2$ as islands within cubic $ZrO_2$ grains, and then cooling to room temperature. The final product exhibits a microstructure consisting essentially of about 50–70% cubic $ZrO_2$, greater than 20% and up to 50% tetragonal $ZrO_2$, and less than 10% monoclinic $ZrO_2$.

9 Claims, No Drawings

STABILIZED ZIRCONIA BODIES OF IMPROVED TOUGHNESS

BACKGROUND OF THE INVENTION

Zirconia demonstrates very high refractoriness but its use in bodies of any substantial bulk has been severely limited because of an extremely disruptive, reversible phase transformation which takes place in the vicinity of 1000°–1100° C.; viz., the polymorphic conversion of the tetragonal crystal form to the monoclinic form. Hence, thermal cycling of $ZrO_2$ bodies through the transformation range, about 900°–1200° C., commonly results in cracking and, not infrequently, the total disintegration thereof, because of the relatively large volume change which accompanies that conversion of crystal forms. Consequently, extensive investigations have been conducted to develop "alloys" of $ZrO_2$ with another metal oxide, the most notable of such being CaO, MgO, and $Y_2O_3$.

The initial research efforts sought to produce a stabilized cubic zirconia (the high temperature $ZrO_2$ structure) and the recited "alloying" oxides are especially effective in forming stable solid solutions with $ZrO_2$ having the cubic fluorite structure. It was soon observed, however, that fully stabilized cubic $ZrO_2$ bodies are not particularly strong or resistant to thermal shock. Continued investigations have demonstrated that partially stabilized $ZrO_2$ bodies can be both stronger and more thermal shock resistant than either unstabilized or completely stabilized $ZrO_2$ articles. The following patents are illustrative of the considerable effort that has been expended in devising $ZrO_2$ bodies manifesting high refractoriness coupled with high strength and good resistance to thermal shock.

U.S. Pat. No. 3,365,317 was directed to the production of $ZrO_2$ bodies illustrating the properties of lubricity, toughness, abrasion resistance, and chemical inertness, thereby recommending their utility as drawing die materials. The bodies consisted essentially, in weight percent, of 96.5–97.2% $ZrO_2$ and 2.8–3.5% MgO, and exhibited coefficients of thermal expansion [room temperature (R.T.) to 1400° C.] not greater than $73 \times 10^{-7}/°C.$, compressive strengths of at least 250,000 psi, and moduli of rupture of at least 27,000 psi. The bodies were sintered at temperatures of 2500°–3500° F. ($\sim$1371°–1927° C.) and the fired product contained tetragonal $ZrO_2$ and cubic and/or monoclinic $ZrO_2$. No quantitative measurement of the proportion of each crystal phase of $ZrO_2$ present was provided, but the objective was to optimize the amounts of tetragonal and monoclinic $ZrO_2$ in the bodies. It was emphasized that impact strength and abrasion resistance decreased with MgO levels greater than 3.5%.

U.S. Pat. No. 3,620,781 was concerned with a method for producing bodies of $ZrO_2$ which were partially stabilized through the inclusion of 2–5% by weight CaO. The bodies were characterized by high moduli of rupture and high Young's moduli. The microstructure of the bodies consisted essentially of cubic $ZrO_2$ grains as the major phase by volume, intergranular primary monoclinic $ZrO_2$ grains of substantially smaller average grain size than that of the cubic grains, and an extremely fine-grained precipitate of monoclinic $ZrO_2$ dispersed intragranularly throughout the cubic grains. The precipitate had an average grain size much smaller (at least one order of magnitude) than the average grain size of the primary monoclinic $ZrO_2$ grains, viz., about 0.1–2 microns in comparison to 10–20 microns.

The inventive method comprised firing the bodies at a temperature of at least 1800° C. and up to the melting temperature of the body, annealing the sintered body by holding it within the range of 900°–1700° C. for a substantial period of time (desirably for at least one day), and then cooling to ambient temperature. The annealing period produces the required precipitate which, in turn, imparts the enhanced strength and elastic modulus to the bodies.

U.S. Pat. No. 3,634,113 described the production of cubic $ZrO_2$ bodies stabilized with 6–20 mole percent of a type C mixed rare earth oxide solid solution containing $Yb_2O_3$, $Er_2O_3$, $Dy_2O_3$, $Ho_2O_3$, $Tb_2O_3$, $Tm_2O_3$, and $Lu_2O_3$. It was asserted that the final bodies were totally free from monoclinic $ZrO_2$ and might consist solely of cubic $ZrO_2$ or might contain a small quantity of tetragonal $ZrO_2$ with the cubic polymorph.

U.S. Pat. No. 3,887,387 claimed a method for preparing $ZrO_2$ bodies by sintering a mixture of 30–90% pulverulent monoclinic $ZrO_2$, 7.8–69.5% pulverulent $ZrO_2$ stabilized with at least one stabilizing oxide selected from the group of MgO, CaO, CdO, $MnO_2$, CoO, $TiO_2$, and rare earth oxides, and 0.5–2.2% of at least one pulverulent stabilizing oxide of the group recited above. The total amount of stabilizing oxide ranged between 2.5–3.5%. The final product was asserted to consist of 75–95% cubic crystals.

U.S. Pat. No. 4,035,191 disclosed means for producing articles of stabilized $ZrO_2$ having microstructures containing less than 10% cubic $ZrO_2$ and at least 5% tetragonal $ZrO_2$ which do not destabilize at temperatures between 1650°–2250° F. ($\sim$899°–1232° C.). The bodies consisted essentially, in weight percent, of 0.1–5.0% ZnO, at least 0.5% of a primary stabilizer selected from the group of 0.25–4% MgO, 0.25–4% $Y_2O_3$, and mixtures thereof, and the balance $ZrO_2$. The bodies are sintered between about 2550°–2950° F. ($\sim$1399°–1621° C.).

U.S. Pat. No. 4,067,745 was drawn to a process for forming a partially stabilized $ZrO_2$ body which consisted of firing, between 1700°–1950° C., a body consisting essentially of 3.3–4.7% by weight CaO and the remainder $ZrO_2$, cooling the body at an average rate of at least 175° C./hour to a temperature between 1200°–1450° C., and aging the body for a period of time (typically about 64 hours) within that latter temperature range. The microstructure of the fired body was stated to be composed of metastable tetragonal domains of critical size within cubic matrix grains. It was asserted that the same controlled microstructure could be developed in MgO-stabilized $ZrO_2$ bodies, but those products are stated to be subject to two problems:

(a) the reaction kinetics are so rapid that it is difficult to introduce quality control procedures into the manufacturing process; and (b) the $MgO$-$ZrO_2$ compositions are subject to a eutectoid decomposition reaction below 1400° C.

U.S. Pat. No. 4,279,655 was directed to a method for preparing bodies of $ZrO_2$ which are partially stabilized with MgO. The method claimed comprised the steps of:

(1) mixing and wet milling 2.8–4.0% by weight MgO, balance $ZrO_2$, to a mean particle size of 0.7 micron, the $ZrO_2$ containing no more than 0.03% $SiO_2$;

(2) calcining the powdered material at 800°–1450° C. for about 24 hours;

(3) wet milling the mixture to a mean particle size of 0.7 micron;

(4) molding the wet mixture into a desired shape;

(5) firing the shape at 1550°–1800° C.;

(6) cooling the shape to a temperature between 800° C. and ambient temperature to induce nucleation, the rate of cooling being controlled so that a tetragonal $ZrO_2$ precipitate phase forms in the sintered material and coarsens to an elliptical precipitate having a major axis of about 1500 Å;

(7) heating the body to an aging/transformation range of 1000°–1400° C.;

(8) holding the body within that temperature range until 2–30% of the tetragonal $ZrO_2$ precipitate is transformed into monoclinic $ZrO_2$ material; and (9) cooling to room temperature.

The microstructure of the final body was described as being composed predominantly of relatively large cubic grains within which grains are elliptically-shaped precipitates of tetragonal $ZrO_2$ having a long dimension of about 1500 Å. The precipitate comprised 2–10% of the material. A grain boundary phase of monoclinic $ZrO_2$ was also present constituting 8–15% of the material. Finally, a monoclinic phase, formed via the transformation of some of the tetragonal precipitate, was dispersed within each cubic $ZrO_2$ grain; that monoclinic phase comprising about 0.5–20% of the material. The monoclinic grains were asserted to be untwinned, in contrast to the twinning conventionally observed in those precipitates when they are transformed from the tetragonal state. The aging step was posited as producing the untwinned monoclinic crystals.

As can be observed from the above review of patent literature, recent research in the field of $ZrO_2$ stabilization has been directed to the formation of partially stabilized $ZrO_2$, the means for accomplishing that goal generally involving two mechanisms. The first has utilized compositional variations; e.g., the use of two or more stabilizing oxides rather than a single stabilizer. To illustrate, when a mixture of $CaO+MgO$ was employed as the stabilizer, it was discovered that the rate of destabilization of $ZrO_2$ above 1000° C. is slower than for either stabilizer alone. The second mechanism has commonly employed a single stabilizer, accompanied with a special heat treatment schedule.

This latter mechanism, which has been termed transformation toughening, has been studied extensively utilizing either CaO or MgO as the stabilizer. MgO has appeared to constitute the preferred stabilizer when using the fine intragranular precipitate approach to toughening. Nevertheless, as has been observed above, that method is very difficult to control. The aging time and the temperature in the cooling and reheating steps must be regulated with extreme care to induce the proper amount of stabilizer movement necessary to produce the desired precipitate of tetragonal $ZrO_2$ of the correct size within the grains of cubic $ZrO_2$. That phenomenon takes place within a range of temperatures wherein the MgO tends to exsolve from the solid solution given sufficient time, leaving a two-phase structure of MgO and monoclinic $ZrO_2$ at room temperature.

SUMMARY OF THE INVENTION

The principal objective of the present invention is to provide means for producing partially stabilized $ZrO_2$ which can be so controlled that bodies exhibiting very high strength, excellent toughness, and good thermal shock resistance can be readily reproduced. The basic concept underlying the present invention is the use of MgO and/or CaO and/or $CeO_2$ and/or CuO and/or ZnO with $Y_2O_3$ as stabilizers in the thermal toughening process. The use of such mixed stabilizers permits control of the kinetics of the precipitation reaction, thereby enabling tailoring of the properties of the final product.

Although the mechanism making possible the modification of the kinetics of the precipitation reaction has not been fully elucidated, two actions are believed to play important roles. Thus, $Y_2O_3$ is very stable in solid solution such that during the aging process it will remain substantially evenly distributed. At the same time, however, the secondary stabilizers diffuse to create understabilized regions or zones which then become the precipitates of tetragonal $ZrO_2$. Nevertheless, when the secondary stabilizers comprise only a portion of the total stabilizer present, a higher fraction thereof must migrate in order to achieve the necessary extent of understabilization needed to form the precipitate. This circumstance requires the body to be exposed for a longer period of time within the aging temperature range and, hence, reduces the sensitivity thereof to minor shifts in compositon and to the time and temperature parameters of the aging step. In essence, the precipitates of tetragonal $ZrO_2$ form small islands within the cubic $ZrO_2$ grains, those islands having dimensions of about 0.25–0.75 micron, with the preferred size being about 0.4 micron. Such very small-dimensioned precipitates are demanded to inhibit the transformation of the tetragonal $ZrO_2$ to the monoclinic polymorph.

This approach permits the size of the precipitates to be regulated such that under the influence of relatively minor tensile stress they can readily transform to the monoclinic polymorph, thereby inhibiting the formation of areas of highly localized tensile stress and, as a result, imparting exceptional toughness to the bodies. Also, the precipitates can have dimensions slightly larger than that required for maximum toughness such that a small portion thereof will transform to monoclinic $ZrO_2$ upon cooling. Those precipitates can then be readily converted back to the tetragonal phase when subjected to relatively small compressive stresses caused by either mechanical or thermal forces.

An apparent application for this approach is to form articles which will be used in the temperature range of about 1000°–1400° C. where the typical partially stabilized zirconia material utilizing a single stabilizing oxide, e.g., MgO or CaO, would continue to destabilize. In the present invention, the secondary stabilizing oxide, i.e., MgO and/or CaO and/or $CeO_2$ and/or CuO and/or ZnO, left in solid solution after the aging step will exert only a minor effect upon dissociation, whereas the $Y_2O_3$ will remain and forestall the rapid destabilization experienced in partially stabilized $ZrO_2$ utilizing a single metal oxide stabilizer.

The inventive method comprises the following six general steps:

(1) a powdered batch is prepared containing $ZrO_2$, $Y_2O_3$, and at least one secondary stabilizer selected from the group of MgO, CaO, $CeO_2$, CuO, and ZnO (or materials which, when fired together, will yield the desired oxides in the proper proportions);

(2) the batch is shaped by pressing, extruding, or other conventional means into a body of a predetermined configuration;

(3) the body is fired at a temperature between about 1600°–1800° C. for a period of time sufficient to sinter the powder into an integral body and allow the solid solution of the stabilizing oxides into the zirconia (where desired, the body can be hot pressed, isostatically hot pressed, or otherwise shaped into a different geometry);

(4) the sintered body is cooled relatively quickly (>100° C./hour) to a temperature between about 1000°–1475° C.;

(5) the body is held within that temperature range for a period of time sufficient to induce the desired precipitation of tetragonal $ZrO_2$, but not so long as to cause excessive grain growth which, upon further cooling, would allow conversion of a substantial proportion of the tetragonal $ZrO_2$ crystals to the monoclinic polymorph; such precipitation being achieved either by a controlled continuous cooling curve or by holding at a fixed temperature for a prescribed time; and then (6) the body is cooled to room temperature.

At least 0.5% $Y_2O_3$ by weight and, preferably, at least 1% $Y_2O_3$ (or an amount of a yttrium-containing batch component required to yield the predetermined $Y_2O_3$ content) must be present as the primary stabilizer. At least 1% by weight and, preferably, at least 2% total of secondary stabilizer oxide (or an amount of a secondary stabilizer batch component needed to yield the prescribed content thereof) will be present. Whereas up to as much as 10% $Y_2O_3$ and up to 10% total of secondary stabilizer oxide may be utilized, such quantities are in excess of those required to induce the necessary precipitation and achieve the desired partial stabilization of $ZrO_2$. Thus, about 6% by weight each of primary and secondary stabilizer oxides has been deemed a practical maximum with less than 3% of each frequently proving to be very satisfactory.

In general, sintering of the batch will be conducted at a temperature and for only a period of time sufficient to insure the formation of solid, integral bodies. Temperatures between about 1600°–1800° C. have proven to be quite satisfactory. Extended firing periods at high temperatures hazard unwanted grain growth. That factor, coupled with economic reality, dictates that the sintering times be restricted to periods actually demanded to achieve an integral body. In general, firing periods of about 0.5–4 hours at a particular temperature have been used.

Cooling of the hot sintered body to the aging temperature region is performed quickly to restrain the rapid diffusion of the secondary stabilizers and to inhibit grain growth. Thus, as has been explained above, it is only through the careful observance of time and temperature parameters within the aging temperature zone that the kinetics of the precipitation reaction can be controlled. Inasmuch as thermal shock is not a problem at these high temperatures, an essentially simultaneous reduction in temperature from the sintering range to the aging temperature region would be quite operable.

The aging temperature zone (about 1000°–1475° C.) comprises the region wherein the secondary stabilizing oxides will diffuse, but not migrate so rapidly that control thereof is rendered difficult. It will be appreciated that the several oxides will diffuse at different rates depending, at least in part, upon the size of the cation and the temperature employed. Consequently, as would be expected, small cations commonly migrate more rapidly than large ions, and the speed with which diffusion takes place typically increases as the temperature is raised. However, care must be exercised to avoid excessive crystal growth of the precipitated tetragonal $ZrO_2$. Likewise, care must be taken to avoid forming excessive monoclinic $ZrO_2$ at the grain boundaries of 1–10 micron dimensions by holding within the aging temperature range too long. Accordingly, a practical compromise must be struck between the desire to complete the aging process as soon as possible by utilizing relatively high temperatures, and the better control of the precipitation reaction inherent with lower temperatures and consequent longer aging periods.

Laboratory experience has indicated that bodies manifesting the greatest toughness, coupled with high strength and high density, contain in excess of 20% by volume and, preferably, in excess of 25% by volume tetragonal $ZrO_2$ with a maximum in the vicinity of 50% by volume. Scanning electron microscope examinations have indicated that the average crystal size of the tetragonal $ZrO_2$ is smaller than 0.5 micron. The near total absence of monoclinic $ZrO_2$ would be preferred to maximize toughness. However, scanning electron microscope and x-ray diffraction analyses have determined the monoclinic polymorph to be present in an amount less than 10% volume, with the preferred products having less than 5% by volume, in order to yield bodies exhibiting the best combination of toughness, density, and mechanical strength. Finally, the content of cubic $ZrO_2$ will range between about 50–70% by volume.

In summary then, whereas an aging period of no more than about one hour at 1475° C. may provide the desired precipitated tetragonal polymorph of $ZrO_2$ where MgO constitutes the secondary stabilizer, such a short time exposure is difficult to control and longer periods at lower temperatures are advantageously employed. Longer periods of aging at like temperatures will be demanded for cations larger than magnesium since the rate of migration of large cations is generally slower than that of smaller cations. Accordingly, a minimum of about one hour in the aging temperature regime may be sufficient, whereas under certain conditions much longer periods, e.g., up to 24 hours and even longer, may be required and/or advantageous to yield the desired degree of precipitation.

Whereas the above description implies the use of a specific dwell period within the aging region, it is frequently more economically attractive to utilize a slow cooling rate through the regime of temperatures to accomplish the same purpose. Accordingly, instead of maintaining the temperature constant at a defined level for a predetermined length of time, comparable aging may be achieved by cooling at a relatively slow and controlled rate, e.g., 25°–50° C./hour, such that the body is exposed to the temperatures within the aging range for an equivalent period of time. In essence then, it is only necessary that the body be subjected to temperatures within the aging region for a sufficient period of time to permit the necessary diffusion of the secondary stabilizing oxide(s) with the consequent production of tetragonal $ZrO_2$.

The rate of cooling from the cooler extreme of the aging temperature zone to room temperature does not appear to exert any substantive effect upon the properties of the final product. Hence, the bodies may simply be cooled in air or permitted to cool in whatever manner is conventional to the art for the product being formed.

As was noted above, U.S. Pat. No. 4,279,655 teaches a method for preparing $ZrO_2$ bodies which are partially stabilized through the inclusion of MgO, the method including an aging process as one step. Thus, a green shape is sintered at 1550°–1800° C., the sintered shape cooled below 800° C. to induce nucleation, and then the shape is reheated to between 1000°-1400° C. The final product contains a substantial proportion of monoclinic $ZrO_2$. In contrast, the present inventive method permits the production of material wherein the amount of monoclinic phase can be carefully controlled for varying applications. For a combination of high toughness and high mechanical strength, the final product will have very little monoclinic $ZrO_2$ therein.

DESCRIPTION OF PREFERRED EMBODIMENTS

Table I records batch compositions, expressed in terms of weight percent on the oxide basis, illustrating the parameters of the invention. In the following laboratory work, oxides of very high purity were utilized as the batch ingredients. Nevertheless, it will be appreciated that other materials, capable of conversion to the desired oxide in the proper proportions upon firing, may be employed.

The batch ingredients were milled together (using $ZrO_2$ balls in a urethane-lined container) in a water suspension also containing conventional organic binders and dispersants to yield a homogeneous batch wherein the particles were substantially all finer than 2 microns in size. The batches were then dried and granulated, conveniently via spray drying, to a moisture content of about 2% by weight. The granulated batches, having particles passing a No. 50 U.S. Standard Sieve (297 microns) where spray drying is utilized, and passing a No. 30 U.S. Standard Sieve (595 microns) where manual granulating is employed, were pressed into discs having diameters of about 1.5" and thicknesses of about 0.33", and those discs were fired at 1675° C., 1725° C., or 1750° C. for two hours in a gas-fired furnace. As is conventional in the ceramic art, low temperature portions of the heating schedule will be designed to permit the removal of water and organic binder in a manner such that the integrity of the body will not be adversely affected. A two-hour firing period at 1675° C., 1725° C., or 1750° C. insures sintering into a solid, integral body with the stabilizers in solid solution with the $ZrO_2$ without the development of excessive grain growth.

TABLE I

|  | 1 | 2 | 3 | 4 | 5 | 6 | 7 | 8 | 9 |
|---|---|---|---|---|---|---|---|---|---|
| $ZrO_2$ | 96.0 | 96.75 | 96.25 | 95.75 | 97.0 | 96.5 | 96.0 | 96.75 | 96.25 |
| MgO | 2.0 | 2.25 | 2.25 | 2.25 | 2.5 | 2.5 | 2.5 | 2.75 | 2.75 |
| $Y_2O_3$ | 2.0 | 1.0 | 1.5 | 2.0 | 0.5 | 1.0 | 1.5 | 0.5 | 1.0 |

Table II reports cooling schedules applied to the discs prepared from the compositions of Table I.

TABLE II

Schedule A
Sinter at 1725° C. for 2 hours
Cool at 600° C./hour to 1400° C.
Cool at 100° C./hour to 1000° C.
Cool at furnace rate to R.T.
Schedule B
Sinter at 1725° C. for 2 hours
Cool at 600° C./hour to 1400° C.
Cool at 25° C./hour to 1000° C.
Cool at furnace rate to R.T.
Schedule C
Sinter at 1725° C. for 2 hours
Cool at 150° C./hour to 1400° C.
Cool at 50° C./hour to 1000° C.
Cool at furnace rate to R.T.
Schedule D TABLE II-continued Sinter at 1725° C. for 2 hours
Cool at 300° C./hour to 1400° C.
Cool at 50° C./hour to 1000° C.
Cool at furnace rate to R.T.
Schedule E
Sinter at 1750° C. for 2 hours
Cool at furnace rate to R.T.
Schedule F
Sinter at 1675° C. for 2 hours
Cool at 450° C./hour to 1200° C.
Cool at 200° C./hour to 1000° C.
Cool at furnace rate to R.T.

Cooling at furnace rate indicates the gas was simply cut off and the furnace allowed to cool down with the discs retained therein. Such cooling does not follow a strictly linear temperature path, being more rapid at higher temperatures than at lower temperatures, but averages somewhat above 200° C./hour.

Table III records measurements of density (g/cm³), modulus of rupture (psi), toughness (MPa$\sqrt{m}$), and coefficient of thermal expansion over the range of 0°-1200° C. ($\times 10^{-7}$/°C.) determined on the compositions of Table I after being exposed to the temperature schedules of Table II. Density was measured in the conventional manner utilizing a modification of the Westphal balance. Modulus of rupture and coefficient of thermal expansion were determined in the conventional manner employing bars cut from the discs having dimensions of about 0.75"×0.25"×0.125". Toughness was measured in the conventional manner using the short, chevron-notched beam technique with bars about 0.5" in length cut from the discs.

TABLE III

|  | Density | Modulus of Rupture | Toughness | Coef. Exp. |
|---|---|---|---|---|
| Example 1 | | | | |
| Schedule A | 5.80 | 4955 | 2.3 | — |
| Schedule B | 5.80 | 8379 | 3.3 | — |
| Schedule C | 5.79 | 6302 | 8.5 | — |
| Schedule D | 5.79 | 7173 | 6.1 | — |
| Schedule E | 5.83 | 9718 | 2.1 | 81.6 |
| Schedule F | 5.79 | 1951 | 1.8 | — |
| Example 2 | | | | |
| Schedule A | 5.80 | 13382 | 3.9 | — |
| Schedule B | 5.75 | 21488 | 5.5 | — |
| Schedule C | 5.76 | 15828 | 9.3 | — |
| Schedule D | 5.76 | 15750 | 5.9 | — |
| Schedule E | 5.81 | 17408 | 5.8 | 75.1 |
| Schedule F | 5.74 | 7357 | 3.3 | — |
| Example 3 | | | | |
| Schedule A | 5.84 | 62944 | 7.6 | — |
| Schedule B | 5.81 | 73167 | 11.1 | — |
| Schedule C | 5.84 | 53502 | 4.9 | — |
| Schedule D | 5.83 | 67232 | 5.6 | — |
| Schedule E | 5.84 | 71679 | 8.1 | 111.2 |
| Schedule F | 5.82 | 8597 | 2.8 | — |
| Example 4 | | | | |
| Schedule A | 5.85 | 51491 | 5.4 | — |
| Schedule B | 5.82 | 63083 | 8.4 | — |
| Schedule C | 5.81 | 65442 | 6.4 | — |
| Schedule D | 5.80 | 45743 | 2.4 | — |
| Schedule E | 5.83 | 67604 | 5.6 | 111.6 |
| Schedule F | 5.86 | 31492 | 4.4 | — |
| Example 5 | | | | |
| Schedule A | 5.76 | 13948 | 5.0 | — |
| Schedule B | 5.65 | — | — | — |
| Schedule C | 5.71 | — | — | — |
| Schedule D | 5.70 | — | — | — |
| Schedule E | 5.74 | 16867 | 4.7 | 37.4 |
| Schedule F | 5.77 | — | — | — |
| Example 6 | | | | |
| Schedule A | 5.80 | 65316 | 7.4 | — |

TABLE III-continued

| | Density | Modulus of Rupture | Toughness | Coef. Exp. |
|---|---|---|---|---|
| Schedule B | 5.79 | 68581 | 16.9 | — |
| Schedule C | 5.81 | 67523 | 7.8 | — |
| Schedule D | 5.81 | 69032 | 9.2 | — |
| Schedule E | 5.82 | 59563 | 7.6 | 110.2 |
| Schedule F | 5.84 | 43908 | 5.6 | — |
| *Example 7* | | | | |
| Schedule A | 5.82 | 51290 | 5.8 | — |
| Schedule B | 5.81 | 75398 | 9.5 | — |
| Schedule C | 5.81 | 78446 | 11.5 | — |
| Schedule D | 5.80 | 64878 | 7.5 | — |
| Schedule E | 5.81 | 69900 | 5.9 | 110.6 |
| Schedule F | 5.82 | 44729 | 4.6 | — |
| *Example 8* | | | | |
| Schedule A | 5.81 | 58590 | 9.16 | — |
| Schedule B | 5.67 | 32844 | 4.7 | — |
| Schedule C | 5.75 | 58467 | — | — |
| Schedule D | 5.80 | 76764 | 14.8 | — |
| Schedule E | 5.81 | 61312 | 9.4 | 108 |
| Schedule F | 5.81 | 54776 | 6.5 | — |
| *Example 9* | | | | |
| Schedule A | 5.76 | 59109 | 6.2 | — |
| Schedule B | 5.74 | 71133 | 15.5 | — |
| Schedule C | 5.75 | 62472 | 7.5 | — |
| Schedule D | 5.80 | 68200 | 8.2 | — |
| Schedule E | 5.77 | 50425 | 5.8 | 111.5 |
| Schedule F | 5.76 | 39837 | 4.0 | — |

As can be seen from the above, a wide variation in physical properties is possible not only with minor changes in composition, but also with variations in the aging process. This latter circumstance is of great practical significance since it permits careful tailoring of a broad range of those properties with relative ease without reliance on critical composition control.

As can be observed from a study of Tables I and II, not all of the compositions demonstrated optimum physical properties utilizing the same aging schedule. To illustrate, the highest toughness value for Example 6 was registered with Schedule B, whereas Schedule C was best for Example 7 and Schedule D for Example 8. That circumstance clearly demonstrates the interaction of chemistry, especially the level of $Y_2O_3$ and the ratio of $Y_2O_3$ with respect to the secondary stabilizers, with the aging cycle employed. Hence, for each level of $Y_2O_3$ and secondary stabilizer, there is a specific aging schedule which will yield the optimum amount and size of precipitate. The precipitates must not be too small or transformation toughening will not be produced, but they must not be too large such that they are transformed into the monoclinic phase.

To further illustrate that feature, the following several compositions (minor modifications of Example 6 which exhibited the highest toughness values) were prepared in like manner to the description above, fired at 1725° C. for 2 hours, and thereafter exposed to the recited aging schedules. Table IV reports those schedules and Table V records the individual compositions accompanied with values of density, modulus of rupture, and toughness measured on each after exposure to a particular aging schedule. In Table V the remainder of each composition consisted of $ZrO_2$.

TABLE IV

Schedule G
Cool at 450° C./hour to 1400° C.
Cool at 50° C./hour to 1000° C.
Cool at furnace rate to R.T.

Schedule H
Cool at 450° C./hour to 1250° C.
Cool at 50° C./hour to 1000° C.
Cool at furnace rate to R.T.

Schedule I
Cool at 450° C./hour to 1550° C.
Cool at 50° C./hour to 1000° C.
Cool at furnace rate to R.T.

Schedule J
Cool at 450° C./hour to 1400° C.
Cool at 12.5° C./hour to 1000° C.
Cool at furnace rate to R.T.

Schedule K
Cool at 450° C./hour to 1400° C.
Cool at 200° C./hour to 1000° C.
Cool at furnace rate to R.T.

Schedule L
Cool at 450° C./hour to 1325° C.
Cool at 25° C./hour to 1000° C.
Cool at furnace rate to R.T.

Schedule M
Cool at 450° C./hour to 1325° C.
Cool at 100° C./hour to 1000° C.
Cool at furnace rate to R.T.

Schedule N
Cool at 450° C./hour to 1475° C.
Cool at 100° C./hour to 1000° C.
Cool at furnace rate to R.T.

Schedule O
Cool at 450° C./hour to 1475° C.
Cool at 25° C./hour to 1000° C.
Cool at furnace rate to R.T.

TABLE V

| Schedule | Density | M of R | Tough |
|---|---|---|---|
| *Example 10 (2.5% MgO, 0.8% $Y_2O_3$)* | | | |
| G | 5.84 | 85025 | 14.3 |
| H | 5.84 | 82335 | 8.4 |
| I | 5.68 | 51926 | 4.08 |
| J | 5.72 | 51413 | 5.3 |
| K | 5.84 | 72292 | 7.53 |
| L | 5.81 | 77799 | 10.04 |
| M | 5.84 | 80384 | 7.52 |
| N | 5.84 | 82669 | 11.24 |
| O | 5.60 | 50785 | 4.06 |
| *Example 11 (2.6% MgO, 0.8% $Y_2O_3$)* | | | |
| G | 5.84 | 82387 | 11.2 |
| H | 5.83 | 80020 | 7.9 |
| I | 5.69 | 62356 | 4.07 |
| J | 5.72 | 55363 | 5.1 |
| K | 5.83 | 81916 | 6.95 |
| L | 5.81 | 83973 | 8.88 |
| M | 5.83 | 80088 | 7.25 |
| N | 5.82 | 90062 | 9.86 |
| O | 5.70 | 63217 | 3.99 |
| *Example 12 (2.7% MgO, 0.8% $Y_2O_3$)* | | | |
| G | 5.81 | 80811 | 9.8 |
| H | 5.80 | 60929 | 6.9 |
| I | 5.68 | 49120 | 4.38 |
| J | 5.69 | 43499 | 5.0 |
| K | 5.81 | 64580 | 6.32 |
| L | 5.81 | 71916 | 8.39 |
| M | 5.81 | 62826 | 6.56 |
| N | 5.80 | 73063 | 8.13 |
| O | 5.68 | 34098 | 4.01 |
| *Example 13 (2.3% MgO, 1.0% $Y_2O_3$)* | | | |
| G | 5.87 | 85509 | 14.2 |
| H | 5.85 | 80968 | 9.6 |
| I | 5.70 | 54618 | 4.06 |
| J | 5.75 | 20508 | 5.7 |
| K | 5.86 | 73013 | 8.11 |
| L | 5.86 | 17473 | 5.52 |
| M | 5.82 | 18471 | 5.59 |
| N | 5.81 | 24513 | 10.0 |
| O | 5.71 | 33581 | 5.62 |
| *Example 14 (2.4% MgO, 1.0% $Y_2O_3$)* | | | |
| G | 5.85 | 81057 | 11.7 |
| H | 5.84 | 78749 | 7.8 |
| I | 5.70 | 53292 | 3.85 |

TABLE V-continued

| Schedule | Density | M of R | Tough |
|---|---|---|---|
| J | 5.72 | 50171 | 4.8 |
| K | 5.85 | 69324 | 7.14 |
| L | 5.86 | 80951 | 9.4 |
| M | 5.85 | 77923 | 7.32 |
| N | 5.83 | 86207 | 9.86 |
| Example 15 (2.5% MgO, 1.0% $Y_2O_3$) | | | |
| G | 5.82 | 75693 | 8.5 |
| H | 5.81 | 55055 | 7.0 |
| I | 5.69 | 44072 | — |
| J | 5.67 | 42961 | 5.5 |
| K | 5.81 | 59878 | 6.3 |
| L | 5.82 | 66100 | 8.32 |
| M | 5.81 | 52803 | 6.56 |
| N | 5.81 | 71638 | 7.83 |
| Example 16 (2.6% MgO, 1.0% $Y_2O_3$) | | | |
| G | 5.83 | 68035 | 8.6 |
| H | 5.82 | 62555 | 7.1 |
| I | 5.70 | 45831 | — |
| J | 5.69 | 45722 | 6.1 |
| K | 5.82 | 52383 | 6.6 |
| L | 5.83 | 71213 | 7.83 |
| M | 5.82 | 63128 | 6.56 |
| N | 5.81 | 74450 | 7.96 |
| O | 5.69 | 13767 | 4.52 |
| Example 17 (2.7% MgO, 1.0% $Y_2O_3$) | | | |
| G | 5.81 | 74872 | 8.4 |
| H | 5.81 | 55268 | 6.0 |
| I | 5.79 | 77936 | — |
| J | 5.65 | 41551 | — |
| K | 5.80 | 61504 | 5.23 |
| L | 5.83 | 61793 | 7.57 |
| M | 5.81 | 54394 | 5.81 |
| N | 5.80 | 64860 | 7.22 |
| O | 5.69 | — | — |
| Example 18 (2.3% MgO, 1.2% $Y_2O_3$) | | | |
| G | 5.85 | 79919 | 10.4 |
| H | 5.85 | 59367 | 7.2 |
| I | 5.71 | 44876 | — |
| J | 5.69 | 44591 | 5.7 |
| K | 5.86 | 69590 | 7.1 |
| L | 5.84 | 60185 | 8.27 |
| M | 5.85 | 53684 | 7.97 |
| N | 5.84 | 56899 | 8.6 |
| O | 5.74 | 49939 | 4.93 |
| Example 19 (2.4% MgO, 1.2% $Y_2O_3$) | | | |
| G | 5.83 | 70614 | 9.1 |
| H | 5.84 | 67133 | 7.1 |
| I | 5.70 | 40357 | — |
| J | 5.71 | 41238 | 6.0 |
| K | 5.84 | 57801 | 6.55 |
| L | 5.85 | 67331 | 8.02 |
| M | 5.84 | 57767 | 7.56 |
| N | 5.83 | 61768 | 8.07 |
| O | 5.70 | 42912 | 4.68 |
| Example 20 (2.5% MgO, 1.2% $Y_2O_3$) | | | |
| G | 5.83 | 67879 | 8.5 |
| H | 5.83 | 67367 | 6.6 |
| I | 5.71 | 47975 | — |
| J | 5.79 | 66370 | 7.9 |
| K | 5.83 | 56204 | 5.97 |
| L | 5.84 | 69579 | 7.8 |
| M | 5.83 | 52239 | 6.64 |
| N | 5.82 | 66648 | 8.08 |
| O | 5.71 | — | — |
| Example 21 (2.6% MgO, 1.2% $Y_2O_3$) | | | |
| G | 5.82 | 75152 | 8.1 |
| H | 5.79 | 59718 | 6.0 |
| I | 5.79 | 75240 | 12.66 |
| J | 5.81 | 65527 | 16.9 |
| K | 5.81 | 57887 | 5.11 |
| L | 5.83 | 65032 | 7.26 |
| M | 5.81 | 53566 | 6.31 |
| N | 5.80 | 59772 | 6.6 |
| O | 5.68 | — | — |
| Example 22 (2.3% MgO, 1.4% $Y_2O_3$) | | | |
| G | 5.83 | 58119 | 8.8 |
| H | 5.83 | 60887 | 7.0 |
| I | 5.72 | 34945 | 4.72 |
| J | 5.81 | 45906 | 7.8 |
| K | 5.84 | 50130 | 6.37 |
| L | 5.82 | 66844 | 8.03 |
| M | 5.84 | 52471 | 6.64 |
| N | 5.84 | 56365 | 7.27 |
| O | 5.74 | 47363 | 4.84 |
| Example 23 (2.4% MgO, 1.4% $Y_2O_3$) | | | |
| G | 5.83 | 78938 | 8.1 |
| H | 5.83 | 63776 | 6.1 |
| I | 5.72 | 61117 | 5.65 |
| J | 5.82 | 83398 | 15.5 |
| K | 5.83 | 69331 | 5.91 |
| L | 5.85 | 69834 | 7.25 |
| M | 5.84 | 61741 | 6.13 |
| N | 5.83 | 78672 | 7.86 |
| O | 5.83 | 81283 | 16.08 |

It is readily apparent from the above Table V that not infrequently the aging heat treatment schedule yielding bodies of the highest mechanical strength will not result in imparting the highest toughness values. Nevertheless, as can readily be observed, there is considerable flexibility in the aging process which enables a wide range of properties to be produced, and wherein the character of those properties can be reproduced in a controlled manner.

To illustrate the utility of employing more than one secondary stabilizing oxide, discs of Example 24, expressed below in terms of weight percent on the oxide basis, were prepared and fired for two hours at 1725° C. in like manner to Examples 10–23, and thereafter subjected to the aging schedules reported in Table IV. Also, like manner to Table V, Table VI records the composition of Example 24 along with values of density, modulus of rupture, and toughness measured after exposure to a particular aging sequence.

TABLE VI

| Example 24 (2.5% MgO, 0.5% ZnO, 1.0% $Y_2O_3$, 96% $ZrO_2$) | | | |
|---|---|---|---|
| Schedule | Density | M of R | Tough |
| G | 5.85 | 85788 | 11.8 |
| H | 5.84 | 70960 | 8.1 |
| I | 5.70 | 40967 | 4.0 |
| J | 5.71 | 49825 | 5.0 |
| K | 5.85 | 75939 | 7.0 |
| L | 5.84 | 78739 | 9.3 |
| M | 5.85 | 77777 | 7.5 |

Table VI again illustrates the great variation in physical properties that can be produced via changes in heat treating schedules, thereby permitting, for example, the tailoring of toughness and modulus of rupture levels depending upon the particular application for which the product is designed.

Another series of materials was produced utilizing $CeO_2$ as the secondary stabilizer. $CeO_2$ also acts as a sintering aid which has a practical benefit in permitting lower firing temperatures to be employed. Furthermore, $CeO_2$ goes into solid solution with $ZrO_2$ more readily at lower temperatures than MgO and CaO.

Table VI records batch compositions, expressed in terms of weight percent on the oxide basis, illustrating the utility of $CeO_2$ as a secondary stabilizer oxide. In like manner to the exemplary compositions discussed above, oxides of very high purity were employed as the batch constituents in the following laboratory work, although other materials, capable of conversion to the desired oxide in the proper proportions upon firing, may be used.

Samples were prepared following the general description provided above for the previous examples. Thus, the batch ingredients were milled together in a water suspension containing conventional organic binders and dispersants, the batches dried and granulated, samples pressed therefrom, and fired at 1600° C. for about 2 hours to sinter into solid, integral bodies.

TABLE VI

|  | 24 | 25 | 26 | 27 |
|---|---|---|---|---|
| $ZrO_2$ | 91 | 89 | 85 | 83 |
| $CeO_2$ | 6 | 6 | 8 | 10 |
| $Y_2O_3$ | 3 | 5 | 7 | 7 |

Each of the sintered samples was then exposed to the following aging temperature schedule:
Cool at 100° C./hour to 1000° C.
Cool at furnace rate to R.T.

Specimens of the proper geometry for measuring density, modulus of rupture, and coefficient of thermal expansion over the range of 0°–1200° C. were cut from the samples as described above. Table VII reports such values determined on Examples 25-28.

TABLE VII

|  | 25 | 26 | 27 | 28 |
|---|---|---|---|---|
| Density (g/cm$^3$) | 5.99 | 5.96 | 5.93 | 5.84 |
| Modulus of Rupture (psi) | 84300 | 91850 | 58400 | 24750 |
| Coefficient of Expansion ($\times 10^{-7}$/°C.) | 87.9 | 90.6 | 102.7 | 104.7 |
| Toughness (MPa $\sqrt{m}$) | — | ~5 | — | — |

No attempt was made to optimize toughness values by varying the aging schedule. The effect of $CeO_2$ and $Y_2O_3$ levels upon modulus of rupture is observedly significant, however.

Laboratory experience has shown that the diffusion of MgO can best be controlled. Therefore, MgO constitutes the preferred secondary stabilizing oxide.

I claim:

1. A ceramic body exhibiting a modulus of rupture in excess of 50,000 psi and a toughness greater than 5 MPa$\sqrt{m}$ consisting essentially of $ZrO_2$ partially stabilized through the presence of 0.5–10% by weight $Y_2O_3$ as the primary stabilizing oxide and 1–10% by weight total of at least one secondary stabilizing oxide selected from the group of MgO, CaO, CuO, ZnO, and $CeO_2$, said body consisting essentially of about 50–70% by volume cubic $ZrO_2$, greater than 20% and up to 50% by volume tetragonal $ZrO_2$ present as islands within the cubic $ZrO_2$ grains and having dimensions of about 0.25–0.75 micron, and less than 10% by volume monoclinic $ZrO_2$ present along the grain boundaries and having dimensions of about 1–10 microns.

2. A ceramic body according to claim 1 containing less than 3% by weight $Y_2O_3$ and less than 3% total of said secondary stabilizing oxide.

3. A ceramic body according to claim 2 wherein MgO constitutes said secondary stabilizing oxide.

4. A ceramic body according to claim 1 wherein said tetragonal $ZrO_2$ islands have dimensions less than 0.5 micron.

5. A method for making a ceramic body exhibiting a modulus of rupture in excess of 50,000 psi and a toughness greater than 5 MPa$\sqrt{m}$ consisting of $ZrO_2$ partially stabilized through the presence of $Y_2O_3$ as the primary stabilizing oxide and at least one secondary stabilizing oxide selected from the group of MgO, CaO, CuO, ZnO, and $CeO_2$ which comprises the steps of:

(a) preparing a batch consisting essentially, in weight percent on the oxide basis, of 0.5–10% $Y_2O_3$, 1–10% total of at least one member of the group of MgO, CaO, CuO, ZnO, and $CeO_2$, and the remainder $ZrO_2$;

(b) shaping said batch into a body of a predetermined configuration;

(c) firing said body at a temperature between about 1600°–1800° C. for a period of time sufficient to produce an integral sintered body;

(d) cooling said sintered body at a rate in excess of 100° C./hour to a temperature between about 1000°–1475° C.;

(e) holding said body within that range of temperatures for a period of time sufficient to induce the precipitation of tetragonal $ZrO_2$ as islands within cubic $ZrO_2$ grains and having dimensions of about 0.25–0.75 microns, thereby producing a body consisting essentially of about 50–70% by volume cubic $ZrO_2$, greater than 20% and up to 50% by volume tetragonal $ZrO_2$, and less than 10% by volume monoclinic $ZrO_2$ present along the grain boundaries and having dimensions of about 1–10 microns; and then (f) cooling said body to room temperature.

6. A method according to claim 5 containing less than 3% $Y_2O_3$ and less than 3% of said secondary stabilizing oxide.

7. A method according to claim 6 wherein MgO constitutes said secondary stabilizing oxide.

8. A method according to claim 5 wherein said body is fired at about 1650°–1775° C. for about 0.5–4 hours.

9. A method according to claim 5 wherein said sintered body is held within or cooled at a controlled rate through the temperature range of about 1000°–1475° C. for about 1–24 hours.

* * * * *